United States Patent
Florjancic

[15] 3,662,539
[45] May 16, 1972

[54] INJECTION MOULDED CHAIN, ESPECIALLY PLASTIC CHAIN

[72] Inventor: Peter Florjancic, St. Mortinstrobe 12, 81 Garmisch-Partenkirchen, Germany

[22] Filed: Oct. 14, 1969

[21] Appl. No.: 866,186

[30] Foreign Application Priority Data

Oct. 16, 1968    Australia...........................A 10093/68

[52] U.S. Cl......................................................59/80, 59/84
[51] Int. Cl.............................................................F16g 13/06
[58] Field of Search........................59/84, 80, 82, 78; 249/57

[56] References Cited

UNITED STATES PATENTS

| | | | |
|---|---|---|---|
| 2,051,653 | 8/1936 | Rich | 249/57 |
| 2,311,317 | 2/1943 | Tegarty | 249/57 |
| 3,380,571 | 4/1968 | Loreck | 59/90 |
| 3,410,085 | 11/1968 | Sheth | 59/84 |
| 3,453,823 | 7/1969 | Mundt | 59/90 |
| 3,507,112 | 4/1970 | Nelson | 59/84 |

FOREIGN PATENTS OR APPLICATIONS

| | | | |
|---|---|---|---|
| 1,041,883 | 6/1953 | France | 59/78 |
| 688,540 | 2/1940 | Germany | 59/84 |
| 15,848 | 2/1914 | Great Britain | 59/84 |
| 554,057 | 6/1943 | Great Britain | 59/78 |

Primary Examiner—Charles W. Lanham
Assistant Examiner—Gene P. Crosby
Attorney—Kemon, Palmer, and Estabrook

[57] ABSTRACT

A chain or the like is formed by injection moulding of a first link into a second link, one of the links having a non-circular cross-section, which cross-section is preferably substantially defined by a semi-circle and a straight line or a polygon, and has an extent perpendicular to the plane of the link which is at least approximately equal to the spacing between the side portions of the other link and a smaller extent in the plane of the link.

6 Claims, 13 Drawing Figures

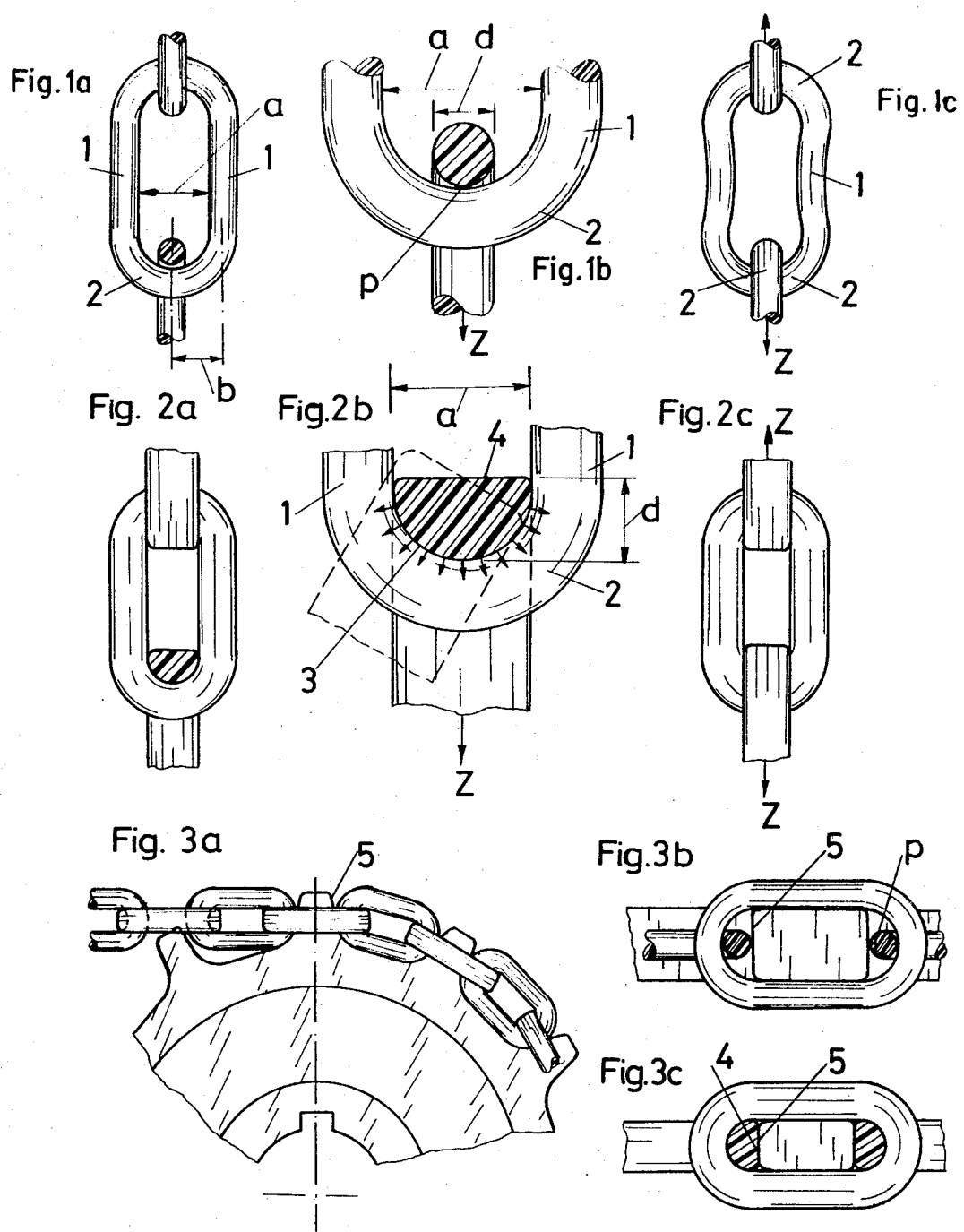

INJECTION MOULDED CHAIN, ESPECIALLY PLASTIC CHAIN

The present invention relates to a link chain or other combination of at least two elements which are separate from one another, which are elongate-ring-shaped and which, in their position of use, engage in one another for transmitting a force from one to the other, which is manufactured by injection moulding of one link or element in the other, at least one link over at least a part of its length having a cross-section which differs from a circular cross-section.

The present invention further relates to a method for the production of such a chain or like.

The expression "injection moulding" in this specification embraces similar methods, especially foaming by introduction into a mould of two substances which react with one another to give off gas.

Injection moulded chains with links having circular cross-sections have, because of their simple manufacture and other advantages, found various fields of application for a wide range of use and are particularly useful in cases where no large tensions occur and no frequent movement of the chain links under load takes place.

In order to prevent the newly made link from joining together with the already existing link during the injection moulding, the spacing between the side portions of the first link must be greater than the diameter of the circular cross-section thereof. This requirement has two serious disadvantages when the chain is under load: firstly, the contact between the links is point contact, which, particularly in the case of drive chains running over chain wheels, causes rapid wear in the vicinity of the point of contact. Moreover, the bending moment of the side portions is large, the comparatively large spacing between the side portions increasing this bending moment. By these two effects, the strength and life of the chain are considerably reduced. Moreover, a chain of this type lengthens a comparatively large amount under load, which is often undesirable, particularly if engagement of the chain with the teeth of chain wheels is thereby impaired.

Chains with a transverse bridge portion, are, it is true, substantially more stable as far as strength and stretching are concerned, but the contact of adjacent links and of the links with the chain wheel is often worse for manufacturing reasons, since the mould parts must be withdrawn at an angle of 45°, so that the abutting surfaces are no longer round but are formed ridge-shaped.

The present invention provides a link chain or other combination of at least two elements which are separate from one another, which are elongate-ring-shaped and which, in their position of use, engage in one another for transmitting a force from one to the other, which is manufactured by injection moulding of one of the links or elements in the other, at least one link over at least a part of its length having a cross-section which differs from a circular cross-section, wherein in the position of use, in particular in the extended condition of the chain, the extent of said link cross-section perpendicular to the plane of the link or ring-shaped element is at least approximately equal to the spacing between the side portions of the other link or element, and the extent, in the plane of the link, of the cross-section differing from a circular cross-section is smaller than the extent perpendicular to the plane of the link.

In its position of use, the first link therefore fills the spacing between the side arms of the other link, at least almost fully, and at its curved portion lies between the side portions of the curved portion of the other element. It is particularly pointed out that the curved portion need not, as usual, be semi-circular, but that different cross sectional shapes, in particular polygons, are conceivable provided only that the shapes of the two links correspond.

This formation of the elements according to the invention enables the production to be effected by injection moulding one of the two links in the other in an angular position differing from the position of use, e.g. by being rotated therefrom through 90°.

By this rotation, an intermediate space is provided between the links which is occupied by the mould during the moulding process. The mould can have a corresponding wall thickness sufficient to resist the injection pressure, so that escape of material or a permanent deformation of the mould is avoided.

Advantageously, the limit of the cross-section is a straight line, so that the curved portions have between the side portions the exterior shape of a semi-cylinder. This has the advantage that when the chain is driven by a chain wheel the abutment with the chain wheel takes place along a line or surface and not, as in chains having links with a circular cross section, at a point or along a line. The forces transmitted are therefore substantially greater, and also wear is practically eliminated.

If the outer limit of the cross-sections of the side portions of the links is straight, advertisements, light reflecting elements or the like can be applied considerably more easily and more effectively than on to round surfaces. For this, various methods such as injection moulding, stamping or the like can be used. Preferably, each second element only is injection moulded and simultaneously or subsequently provided with the stamping. Finally, these links are then connected together by injection moulding into a chain.

If the chain is intended to run on a chain wheel, then the outer side of the cross-section is suitably made round so that the cross section is made of a straight line and a semi-circular arc. If, however, instead of the semi-circle a polygon is used (in the simplest case the cross-section would then be triangular) and if the counter surfaces are so formed that in the position of use — which for a chain is normally the extended position — the surfaces fully abut one another, then twisting of the links relative to one another is not possible, or at least is not possible without modification. It is proposed, according to a further embodiment of the invention, to provide projections or recesses which retain the links in their position of use, the displacement from this position then only being possible by resilient springing back, for example, of the side portions. The chain then forms a straight or curved rod having some rigidity, which however by axially pressing together — e.g. for transport purposes — can be changed into a series of links hanging loosely together.

The invention will be more readily understood from the following description of embodiments thereof given by way of example with reference to the accompanying drawings, in which:

FIGS. 1a to 1c show a prior art chain in side view, in section on an enlarged scale, and under load;

FIGS. 2a to 2c show corresponding views of a chain embodying the present invention;

FIGS. 3a to 3c show the chain on a chain wheel;

Figure 4A:
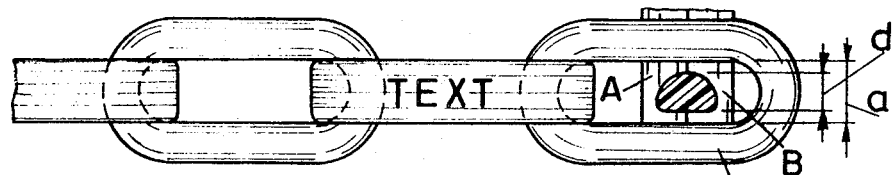
FIGS. 4a and 4b show the manufacture of a chain.

In FIGS. 1a to 1c there is shown a prior art chain in which the spacing "$a$" between the side portions 1 is substantially greater than the diameter "$d$" of the circular cross-section of the links. The contact between the two links therefore occurs at a point "P." When a pull is exerted in the direction "Z," the side portions 1 are not only subjected to tension but also to a bending stress corresponding to the lever arm "$b$," which deforms the side portions in the manner illustrated in FIG. 1c and by reducing the radius of the curved end portion 2 of each element results in an elongation of the chain.

FIGS. 2a to 2c show a chain embodying the present invention under the same conditions. The cross-section is defined by a semi-circular arc 3 and a straight line 4, which are connected to one another by transitional curves. The diameter $2r$ of the semi-circle is equal to the free spacing "$a$" between the side portions 1 of the links, while the thickness "$d$," measured perpendicular thereto, of the cross-section is equal to only half of the spacing "$a$."

When the chain is in its normal position of use, i.e. in an extended condition, the semi-circular arc 3 of each link lies against the curved end portion 2 between the arms 1 of the adjacent link. Even when the chain is curved, for example as when running around a roller, so that the centerlines of the two links subtend an angle, the surface-to-surface abutment is maintained. High surface pressures and rapid wear therefore do not occur.

As shown in FIGS. 3a to 3c, the sides of chain wheels are, for manufacturing reasons, commonly formed with flat sides 5. With the prior art chains having links of circular cross-section, there is point contact P (see FIG. 3b); by rounding of the roots of the teeth, this can at best be improved to line contact. In contrast, the present chain has a straight outer contour 4, so that by rounding of the root of the teeth a surface-to-surface contact can be obtained.

Figure 4B:
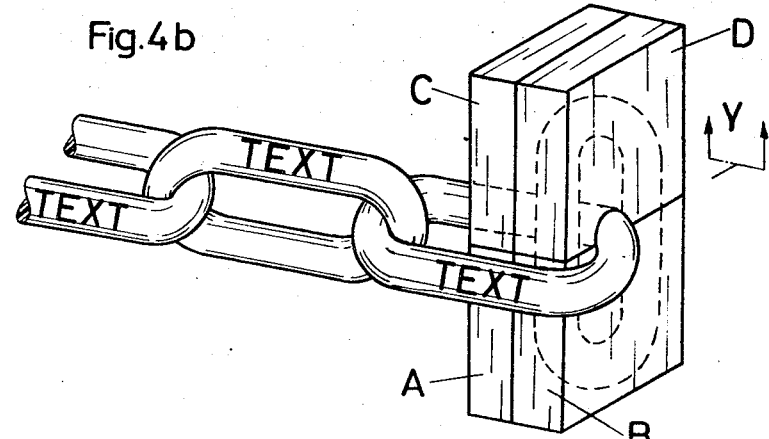

As FIG. 4a shows, the present chain may be manufactured by injection moulding in a position other than the position of use. Preferably, the mould is twisted through 90°. In this way, the spacing "a" between the side portions 1 is larger then the small cross-sectional dimension "d," and there remains, in the moulding position shown, between the two links a free space for four mould parts A, B, C, and D. FIG. 4b also shows the sequence of movements when the mould is removed: firstly the parts A and C are moved in the direction X, and then the parts C and D are removed in the direction Y.

In the embodiment illustrated in FIG. 4a, all of the links carry an advertising wording. It is however pointed out that the individual links need not be similar to one another and in particular that only the alternate links, which are subsequently joined into a chain by the injection moulding described above, may, if desired, be provided with lettering. Morever, each link need not have a cross-section different from the circular shape. Finally, the difference from the circular shape can be limited to a part of the link, in particular to one or both side portions.

Figure 5:
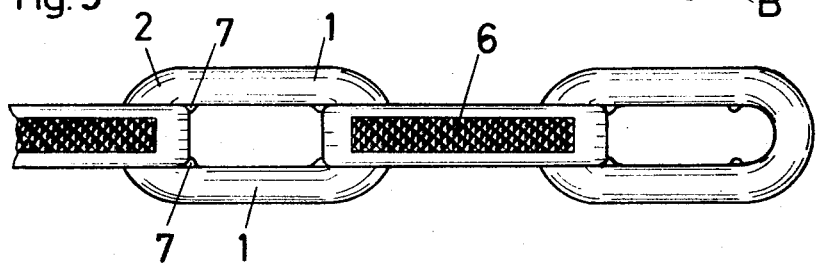
FIGS. 5 and 6 show two possible modifications.

FIG. 5 shows a boundary chain with light reflecting glass members 6, such as are used as reflectors in the kerb stones of streets, incorporated during the injection moulding. In addition, on each of the links of this chain in the vicinity of the transition between the side portions and the curved end portions there are moulded inner projections 7. When the chain is extended, the curved end portions 2 of the adjacent links slide over these projections 7, pressing the side portions outwardly. In this way the links are retained in their extended positions, and the chain is given the properties of a rod in that it is to a certain extent resistent to bending and torsion. It can therefore, for example, project in a self-supporting manner by a certain amount free of its support, and the projecting portion and the support are not damaged if the former is hit by a vehicle. When this happens, one of the links springs over the projections 7 of the adjacent link, and the chain then hangs downwardly. For transport purposes, the links need only to be pushed together axially, whereupon they form random heaps as with a normal chain, which can be accommodated in a small space.

Figure 6:
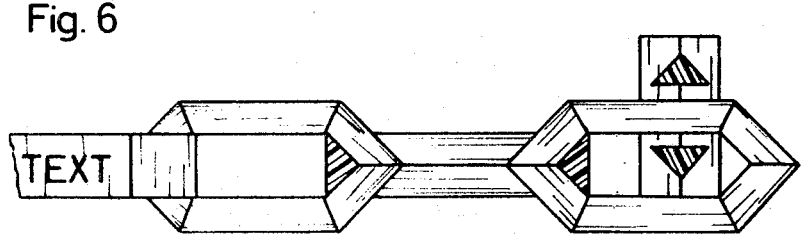

The rigidity of the rod can be increased by the embodiment shown in FIG. 6, the cross-section then having the shape of a triangle. For increasing the rigidity of the chain, this triangle can be changed to a quadrant. The injection moulding must in that case be effected with the links twisted through 45° relative to one another.

I claim:

1. A link chain or like article from moldable material comprising at least two separate links that are elongate-ring-shaped consisting of two opposed side portions and two opposed curved end portions, said links in their position of use of the chain engaging one another along lines in at least two planes that are perpendicular to each other for transmitting a force from one link to the other, the length of the cross-section in a plane transverse to the plane of a link being approximately equal to the spacing between the side portions of the other link, the cross-section of each link being substantially defined by a circular arc and a straight line and shorter in length in the plane of the link than transverse to the plane of the link.

2. A link chain as claimed in claim 1 wherein at least one of said links has projections extending inwardly from the side portions thereof which allow displacement of the links from said position of use only by resilient deformation of at least one of said links.

3. A link chain as claimed in claim 1 wherein the curvature of said circular arc is at least approximately equal to the inner curvature of the curved end portion of the other link against which the first link abuts in its position of use.

4. A method for manufacture of a link chain of a form that has at east two separate links that are elongate-ring-shaped consisting of two opposed side portions, said links in their position of use of the chain engaging one another along lines in at least two planes that are perpendicular to each other for transmitting a force from one link to the other, the length of the cross-section in a plane transverse to the plane of a link being approximately equal to the spacing between the side portions of the other link, the cross-section of each link being shorter in length in the plane of the link than transverse to the plane of the link which comprises injection molding a first link, closing the parts of a multisectional injection mold about said first link, injection molding a second link in the closed mold at an angular position twisted 90° from the position of said second link to said first link in the position of use of the chain, opening the parts of said mold to release said second link and repeating said mold closing, injection molding and mold opening steps forming successive new links until a chain of desired length is produced.

5. The method of claim 4 wherein an ornament or like member is molded on an outer surface of a link of the chain.

6. The method of claim 5 wherein ornamentation is applied upon an outer surface of said first link prior to said step of closing the injection mold about the link and said second link is molded without any ornament or like member upon an outer surface.

* * * * *

UNITED STATES PATENT OFFICE
CERTIFICATE OF CORRECTION

Patent No. 3,662,539				Dated May 16, 1972

Inventor(s) Peter Florjancic

It is certified that error appears in the above-identified patent and that said Letters Patent are hereby corrected as shown below:

[72]	Peter Florjancic, St. Mortinstrobe 12, 81 Garmisch-Partenkirchen, Germany should be:

[72]	Peter Florjancic, St. Martinstrasse 12, 81 Garmsich-Partenkirchen, Germany

[30]	Foreign Application Priority Data

October 16, 1968 Australia...........A 10093/68 should be:

[30]	Foreign Application Priority Data

Oct. 16, 1968   Austria.............A 10093/68

Signed and sealed this 15th day of May 1973.

(SEAL)
Attest:

EDWARD M. FLETCHER, JR.						ROBERT GOTTSCHALK
Attesting Officer						Commissioner of Patents